United States Patent Office 3,532,637
Patented Oct. 6, 1970

3,532,637
SOLID REGENERABLE ABSORBER FOR ACID GASES
Jack D. Zeff, Livingston, N.J., and Albert J. Glueckert, Skokie, Ill., assignors to General American Transportation Corporation, Chicago, Ill.
No Drawing. Filed Apr. 5, 1967, Ser. No. 628,536
Int. Cl. C09k 3/00; B01d 39/14, 41/04
U.S. Cl. 252—190
17 Claims

ABSTRACT OF THE DISCLOSURE

A solid regenerable absorber for removing from gas streams acid gases including carbon dioxide and sulfur dioxide and hydrogen sulfide, the absorber being regenerated by moderate heating to a temperature in the range from about 150° F. to about 175° F., the absorber comprising a porous body of adsorbent material such as silica, an acid gas sorbent distributed through and adherent to the porous body, the sorbent being selected from the class consisting of the alkali metal salts of monoaminoalkanecarboxylic acids and polyaminoalkanecarboxylic acids and the alkali metal salts thereof and the alkali metal salts of monoaminoalkanesulfonic acids, a hygroscopic compound distributed through and carried by the porous body, the hygroscopic compound being neutral in character and stable at temperatures up to at least 175° F., a typical example of the hygroscopic compound being ethylene glycol, and water distributed through and adsorbed on the porous body and bound by the hygroscopic compound.

The present invention is directed to a solid regenerable absorber for removing from gas streams acid gases including carbon dioxide and sulfur dioxide and hydrogen sulfide.

The solid regenerable absorber of the present invention is particularly useful in closed or semi-closed respiratory support systems such as air systems used in submarines, aircraft and space vehicles. Acid gas absorbers for such use should be solid, have a high porosity, be unaffected by water vapor so as to require no pre-drier, be unaffected by organic chemical vapors, have a high holding capacity for absorbed gases in relation to the weight of the absorber, react readily with the acid gas so that suitable removal rates are provided, be stable under all conditions of use including regeneration, be regenerable at low temperatures, and upon regeneration must not generate noxious fumes or gases that would be objectionable or irritating in a respiratory support system.

It is a general object of the present invention to provide a solid generable absorber that possesses all of the above-mentioned desirable characteristics and which more particularly is regenerable at a low temperature in the range from about 150° F. to about 175° F., is light in weight and has a high acid gas holding capacity in relation to its weight, reacts readily with the acid gases yet is stable during all phases of the operation thereof, requires no pre-drier and is unaffected by organic chemical vapors, and upon regeneration does not generate noxious fumes or gases.

It has been found that these and other objects of the invention are fulfilled by a solid regenerable absorber comprising a porous body of adsorbent material, an acid gas sorbent distributed through and adhered to the porous body, the sorbent being selected from the class consisting of the alkali metal salts of monoaminoalkanecarboxylic acids and polyaminoalkanecarboxylic acids and the alkali salts thereof and the alkali metal salts of monoaminoalkanesulfonic acids, a hygroscopic compound distributed through and carried by the porous body, the hygroscopic compound being neutral in character and stable at temperatures up to at least 175° F., and water distributed through and adsorbed on the porous body and bound by the hygroscopic compound.

Finally divided silica having a large surface area is the preferred adsorbent material, but other materials useful in place of silica are alumina, processed cellulose such as methyl cellulose, activated carbon and magnesium carbonate. Although precipitated silica is entirely useful in the present invention, certain important improvements are realized if a colloidal pyrogenic silica is used.

The acid gas sorbent preferably is one wherein the alkane group is a short chain aliphatic group containing from 1 to 5 carbon atoms, and at least one of the amino groups in the sorbent has one substitution therein to provide a secondary amino group, the preferred substitution group being a methyl group. Four particularly useful sorbents have been found, these being the alkali metal salts of sarcosine, the alkali metal salts of N-methyl alanine, the alkali metal salts of N-methyl taurine and L-arginine and the alkali metal salts thereof.

The preferred hygroscopic compounds useful in the present invention are polyhydroxy short chain aliphatic alcohols wherein the aliphatic chain contains 1 to 6 carbon atoms; examples of preferred hygroscopic compounds are ethylene glycol, propylene glycol, glycerol and sorbitol. The hygroscopic compound must be neutral in character, i.e., must have a neutral pH, and must be stable at regenerating temperatures, i.e., up to at least 175° F.

Finally, there is a preferred ratio among the ingredients, the adsorbent material preferably comprising at least about 15% by weight of the absorber, the ratio by weight of the sorbent to the adsorbent material being in the range from about 0.4 to about 2.0, the molar ratio of the sorbent to the hygroscopic compound being in the range from about 0.1 to about 0.5, and the molar ratio of water to sorbent being at least about 1, although higher ratios on the order of 5 to 10 are preferred.

The following are specific examples of the solid regenerable absorber of the present invention, it being understood that these examples are given for illustrative purposes only and are not set forth to limit the scope of the invention herein.

EXAMPLE 1

The following compounds are thoroughly mixed in the proportions indicated:

| Ingredient: | Percent by weight |
|---|---|
| Silica ("Cab-O-Sil M-5") | 20 |
| Sodium Sarcosinate (30% aqueous solution) | 39 |
| Ethylene glycol | 33 |
| Water | 8 |
| | 100 |

The mixture was next dried at 220° F. until a 40% loss in weight was achieved. Then 1% of the dried weight of gum tragacanth and 2% of the dried weight of a processed methyl cellulose ("Solka-Floc BW-40") were added and the resultant mixture pressed into cylindrical tablets each having a diameter of 5/32 inch and a thickness of 1/8 inch to provide a solid regenerable absorber in accordance with the present invention.

In a first use of the absorber made in accordance with Example 1, the tablets were placed in a glass column and exposed to an air stream having 50% relative humidity and containing 1% by volume carbon dioxide, the temperature of the air stream being held at 75° F.±5° F. It was found that the absorber quickly removed the carbon dioxide from the air stream.

After a substantial quantity of carbon dioxide had been absorbed, the absorber was regenerated by heating it to a temperature of 150° F., thereby to remove therefrom the absorbed carbon dioxide. The absorption-regeneration cycle was repeated fifty times without any detectable decline in the operation of the absorber.

In another use of the absorber in accordance with Example 1, the tablets were placed in a glass column and exposed to an air stream having 50% relative humidity and containing 1% by volume sulfur dioxide, the temperature of the air stream being held at 75°±5° F. It was found that the absorber quickly removed the sulfur dioxide from the air stream. After a substantial quantity of sulfur dioxide had been absorbed, the absorber was regenerated by heating to a temperature of 150° F., thereby to remove therefrom the absorbed sulfur dioxide. The absorption-regeneration cycle was repeated fifty times without any detectable decline in the operation of the absorber.

In the absorber of Example 1, the silica serves as an adsorbent material pressed into a porous body having a large effective surface area, the silica utilized being colloidal silica prepared in a hot gaseous environment by a vapor-phase hydrolysis of a silicon compound; the silica has high chemical purity, enormous external surface area, and a high degree of particle separation. Although the colloidal silica of Example 1 is the preferred adsorbent material for the present invention, other adsorbent materials are useful including precipitated silica such as that sold under the trademark "Quso G30," finely divided alumina, finely divided and activated carbon, and finely divided purified magnesium carbonate. In the formulation of Example 1, the silica may comprise as little as 15% by weight of the formulation and up to as much as 25% by weight or more, but in all forms of the present invention it is preferred that the adsorbent material, the silica in Example 1, comprise at least about 15% by weight of the absorber.

The sodium sarcosinate in Example 1 is an acid gas absorber, this compound being in the class known as "Zwitterions," i.e., the amino group at one end of the compound is reactive with acids, such as carbonic acid, and the carboxyl group on the other end of the compound is reactive with basic groups. Loss of the compound during the heating for regenerating purposes is materially reduced by using the alkali metal salts, in this regard it also is pointed out that sodium sarcosinate has a very high boiling point at atmospheric pressure, whereby it is not easily removed from the adsorbent silica. The amino group in the sodium sarcosinate will react with carbonic acid, it being pointed out that this amino group is a secondary amino group in that one of the hydrogen atoms therein is replaced by a methyl group to provide a secondary amino acid; the secondary amino acid is preferred because the "apparent dissociation constant," ($K_B$), and consequently the reactivity, is increased. At least one mole of the sodium sarcosinate is required to hold one mole of carbonic acid, it being pointed out that the sodium sarcosinate will react only with carbonic acid and not with free carbon dioxide; accordingly, the presence of water in the absorber is essential and is assured due to the presence of the ethylene glycol therein. The sodium sarcosinate is present in an amount of 39% by weight of a 30% aqueous solution, whereby 11.7% by weight of the mixture is the free acid gas sorbent compound. The amount of sodium sarcosinate can be varied from about 9% to about 15% by weight in Example 1. Preferably the ratio by weight between the sodium sarcosinate and the silica in Example 1 is in the range from about 0.4 to about 1.0.

The sodium sarcosinate of Example 1 is in essence a derivative of a monoaminoalkanecarboxylic acid, and is more specifically a N-methyl substituted secondary amino acid, and more particularly the sodium salt thereof. Other alkali metal salts of monoaminoalkanecarboxylic acids may be utilized in place of the sodium sarcosinate of Example 1, and other examples will be given hereinafter. It is pointed out that in order to provide a high ratio between the weight of carbon dioxide absorbed and the total weight of the absorber, it is desirable that the sorbent have a low molecular weight, whereby it is preferred that the alkane backbone of the sorbent be a short chain aliphatic group containing from 1 to 5 carbon atoms.

The ethylene glycol in Example 1 acts as a hygroscopic compound to insure that water will be present in the absorber to be available for reaction with the carbon dioxide to form the carbonic acid, the sodium sarcosinate reacting only with carbonic acid and not with free gaseous carbon dioxide. The amount of ethylene glycol useful in Example 1 may be as little as 25% by weight or as much as 50% by weight or more, the ratio or the sorbent (sodium sarcosinate) to the ethylene glycol preferably being in the range from about 0.1 to about 0.3.

The hygroscopic compounds useful in the present invention must be neutral in character, i.e., have a neutral pH in aqueous solutions, must have high boiling points and must be stable at temperatures up to at least 175° F. so that the hygroscopic compound will not be lost during the regeneration by heating of the absorber.

It will be understood that other hygroscopic compounds may be used in place of the ethylene glycol of Example 1, the polyhydroxy short chain aliphatic alcohols being preferred. Other specific examples of hygroscopic compounds useful in place of the ethylene glycol are propylene glycol, glycerol and sorbitol.

Summarizing, the absorber of Example 1 is solid, possesses a high porosity, and reacts readily with carbon dioxide in air streams to absorb the carbon dioxide therefrom. The absorber is regenerable by heating to relatively low temperatures in the range from about 150° F. to about 175° F., each component thereof being stable and non-volatile at such temperatures. Regeneration of the absorber does not generate noxious fumes or gases that would be highly objectionable in a closed respiratory support system. Furthermore, it is pointed out that the absorber has an unusually high absorption capacity for carbon dioxide and sulfur dioxide and hydrogen sulfide in relation to the weight thereof, it being pointed out that both the sorbent (sodium sarcosinate) and the hygroscopic compound (ethylene glycol) have low molecular weights in relation to the gas binding and water binding capacities thereof, respectively. Finally, it is pointed out that the absorber will not be adversely affected by water vapor in the air stream treated and likewise the absorber is unaffected by organic chemical vapors in the air stream being treated.

The following is an example of the use of another sorbent in place of the sodium sarcosinate of Example 1.

EXAMPLE 2

The following compounds are thoroughly mixed in proportions indicated:

| Ingredient: | Percent by weight |
| --- | --- |
| Silica ("Cab-O-Sil M-5") | 23 |
| Potassium Salt of N-methyl alanine (40% aqueous solution) | 28 |
| Ethylene glycol | 26 |
| Water | 26 |
|  | 100 |

The mixture was next dried at 220° F. until a 40% loss in weight was achieved. Then 1% of the dried weight of gum tragacanth and 2% of the dried weight of a processed methyl cellulose ("Solka–Floc BW–40") were added and the resultant mixture pressed into cylindrical tablets each having a diameter of 5/32 inch and a thickness of 1/8 inch to provide a solid regenerable absorber in accordance with the present invention.

The absorber of Example 2 was found readily to absorb carbon dioxide and sulfur dioxide and hydrogen sulfide from air streams, and also was found to be readily regenerable by heating to a temperature in the range from 150° F. to 175° F. In general the absorber of Example 2 possessed all of the desirable characteristics of the absorber of Example 1 above.

It is noted that in the absorber of Example 2 the molar ratio of the sorbent (potassium salt of N-methyl alanine) to the ethylene glycol is preferably in the range from about 0.13 to about 0.28.

The following is an example of an absorber made in accordance with the present invention wherein the sorbent is an alkali metal salt of an amino sulfonic acid rather than in alkali metal salt of an amino carboxylic acid, and more specifically as monoaminoalkanesulfonic acid alkali metal salt.

EXAMPLE 3

| Ingredients: | Percent by weight |
|---|---|
| Silica ("Cab–O–Sil M–5") | 20 |
| Sodium Salt of N-methyl taurine (65% aqueous solution) | 39 |
| Ethylene glycol | 33 |
| Water | 8 |
| | 100 |

The mixture was next dried at 220° F. until a 40% loss in weight was achieved. Then 1% of the dried weight of gum tragacanth and 2% of the dried weight of a processed methyl cellulose ("Solka–Floc BW–40") were added, and the resultant mixture pressed into cylindrical tablets each having a diameter of 5/32 inch and thickness of 1/8 inch to provide a solid regenerable absorber in accordance with the present invention.

The absorber of Example 3 was found readily to absorb carbon dioxide and sulfur dioxide and hydrogen sulfide from air streams, and also was found to be readily regenerable by heating to a temperature in the range from 150° F. to 175° F. This form of the invention was found to have an unusually long life and was fully operative after more than five hundred absorption-regeneration cycles. In general the absorber of Example 3 possessed all of the desirable characteristics of the absorber of Example 1 above.

In the composition of Example 3, the absorber may contain from about 15% by weight to about 25% by weight of the silica; from about 20% by weight to about 30% by weight of the sodium salt of N-methyl taurine on a dry basis; from about 25% by weight to about 40% by weight of the ethylene glycol; and from about 15% by weight to about 25% by weight water. The ratio by weight between the sorbent, the sodium salt of N-methyl taurine, and the silica is in the range from about 0.8 to about 2.0, the preferred value being about 1.3. The molar ratio between the sorbent, the sodium salt of N-methyl taurine, and the ethylene glycol is in the range from about 0.23 to about 0.5, the preferred ratio being about 0.35.

The following is an example of the use of polyaminoalkanecarboxylic acid as the sorbent in the absorber of the present invention.

EXAMPLE 4

| Ingredients: | Percent by weight |
|---|---|
| Silica ("Cab-O-Sil M–5") | 31 |
| L-arginine | 16 |
| Ethylene glycol | 16 |
| Water | 37 |
| | 100 |

The mixture was next dried at 220° F. until a 40% loss in weight was achieved. Then 1% of the dried weight of gum tragacanth and 2% of the dried weight of processed methyl celulose ("Solka-Floc BW–40") were added and the resultant mixture pressed into cylindrical tablets each having a diameter of 5/32 inch and a thickness of 1/8 inch to provide a solid regenerable absorber in accordance with the present invention.

The absorber of Example 4 was found readily to absorb carbon dioxide from air streams, and also was found to be readily regenerable by heating to a temperature in the range from 150° F. to 175° F. In general the absorber of Example 4 possessed all of the desirable characteristics of the absorber of Example 1 above.

In the composition of Example 4, the molar ratio between the sorbent, L-arginine, and the ethylene glycol is preferably in the range from about 0.24 to about 0.52, the preferred value being about 0.35.

The following is another preferred example of the present invention.

EXAMPLE 5

| Ingredients: | Percent by weight |
|---|---|
| Silica ("Quso G30") | 17.7 |
| Sodium salt of N-Methyl Taurine (65% aqueous solution) | 34.4 |
| Ethylene glycol | 29.1 |
| Water | 18.8 |
| | 100.0 |

The above ingredients were thoroughly mixed, formed into balls, and heated at 220° F. until there was a loss of weight in the range 30% to 40%. The balls were crushed and from the crushed balls there was taken those particles that passed a ten mesh screen and were caught on a twenty mesh screen, these particles being a solid regenerable absorber in accordance with the present invention.

The absorber of Example 5 was found readily to absorb carbon dioxide and hydrogen sulfide from air streams, and also was found to be readily regenerable by heating to a temperature in the range from 150° F. to 175° F. In general the absorber of Example 5 possessed all of the desirable characteristics of the absorber of Example 3 above.

In the composition of Example 5, the absorber may contain from about 14% by weight to about 21% by weight of the silica; from about 27% by weight to about 42% by weight of the aqueous solution of the sodium salt of N-methyl taurine; from about 23% by weight to about 35% by weight of the ethylene glycol; and from about 15% by weight to about 23% by weight water. The ratio by weight between the sorbent, the sodium salt of N-methyl taurine, and the silica is in the range from about 1.3 to about 3.0, the preferred value being about 2.0. The molar ratio between the sorbent, the sodium salt of N-methyl taurine, and the ethylene glycol is in the range from about 0.23 to about 0.5, the preferred ratio being about 0.34.

From the above it will be seen that there has been provided a solid regenerable absorber which fulfills all of the objects and advantages set forth above. More specifically, there has been provided an absorber which has a high caapcity for absorbing carbon dioxide and sulfur dioxide and hydrogen sulfide, the absorber reacting readily with the acid gases named to absorb the same, yet being regenerable at relatively low temperatures in the range from about 150° F. to about 175° F. The absorber requires no pre-drier for the air stream being treated and is unaffected by organic chemical vapors. The absorber and each ingredient therein is highly stable at all temperatures encountered in use and upon regeneration there are not generated any noxious fumes or gases that would be objectionable in a closed or semi-closed respiratory support system. Finally, there has been provided an absorber which has the ability to absorb a large weight of the acid gases named in relation to the total weight of the absorber, thereby to achieve substantial economy in transpiring the absorber during the use thereof.

What is claimed is:

1. A solid regenerable absorber for removing from gas streams acid gases including carbon dioxide and sulfur dioxide and hydrogen sulfide, said absorber consisting essentially of a porous body of adsorbent material selected from the group consisting of silica, alumina, methyl cellulose, activated carbon, and magnesium carbonate, said adsorbent material consisting of about 14% to about 31% by weight of said adsorber, an acid gas sorbent distributed through and adhered to said porous body, said sorbent being selected from the class consisting of the alkali salts of monoaminoalkanecarboxylic acids and polyaminoalkanecarboxylic acids and the alkali metal salts there of and the alkali salts of monoaminoalkanesulfonic acids, a polyhydroxy short chain alcohol distributed through and carried by said porous body, said polyhydroxy short chain alcohol containing from one to six carbon atoms and being neutral in character and stable at temperatures up to at least 175° F., and water distributed through and adsorbed on said porous alcohol.

2. The absorber set forth in claim 1, wherein said adsorbent material is finely divided silica having a large surface area.

3. The absorber set forth in claim 1, wherein said adsorbent material is colloidal pyrogenic silica.

4. The absorber set forth in claim 1, wherein the alkane group in said sorbent contains from 1 to 5 carbon atoms.

5. The absorber set forth in claim 1, wherein at least one of the amino groups in the sorbent has one substitution thereon to provide a secondary amino group.

6. The absorber set forth in claim 5, wherein said substitution in the amino group is a methyl group.

7. The absorber set forth in claim 1, wherein said sorbent is one of the alkali metal salts of sarcosine.

8. The absorber set forth in claim 1, wherein said sorbent is one of the alkali metal salts of N-methyl-alanine.

9. The absorber set forth in claim 1, wherein said sorbent is one of the alkali metal salts of N-methyl taurine.

10. The absorber set forth in claim 1, wherein said sorbent is L-arginine.

11. The absorber set forth in claim 1, wherein said polyhydroxy short chain alcohol is ethylene glycol.

12. The absorber set forth in claim 1, and further comprising a binding agent for holding said adsorbent material in tablet form, said binding agent being gum tragacanth.

13. A solid regenerable absorber for removing from gas streams acid gases including carbon dioxide and sulfur dioxide and hydrogen sulfide, said adsorber consisting essentially of a porous body of adsorbent material selected from the group consisting of silica, alumina, methyl cellulose, activated carbon, and magnesium carbonate, an acid gas sorbent distributed through and adhered to said porous body, said sorbent being selected from the class consisting of the alkali metal salts of monoaminoalkanecarboxylic acids and polyaminoalkanecarboxylic acids and the alkali metal salts thereof and the alkali metal salts of monoaminoalkanesulfonic acids, a polyhydroxy short chain alcohol distributed through and carried by said porous body, said polyhydroxy short chain alcohol containing from one to six carbon atoms and being neutral in character nd stable t temperatures up to at least 175° F., and water distributed through and adsorbed on said porous body and bound by said polyhydroxy short chain alcohol, said adsorbent material comprising at least about 15% by weight of said absorber, the ratio by weight of said sorbent to said adsorbent material being in the range from about 0.4 to about 2.0, the molar ratio of said sorbent to said polyhydroxy short chain alcohol being in the range from about 0.1 to about 0.5, the molar ratio of water to sorbent being at least about 1.

14. The absorber set forth in claim 13, wherein the ration by weight of said sorbent to said adsorbent material is about 1.3.

15. The absorber set forth in claim 14, wherein the molar ratio of said sorbent to said polyhydroxy short chain alcohol is about 0.35.

16. The absorber set forth in claim 13, wherein the molar ratio of water to sorbent is about 7.

17. A solid regenerable absorber for removing from gas streams acid gases inclding carbon dioxide and sulfur dioxide and hydrogen sulfide, said absorber consisting essentially of from about 14% to about 31% by weight of a porous body of finely divided silica, from about 16% to about 39% by weight of an acid gas sorbent distributed through and adhered to said porous body, said sorbent being selected from the class consisting of the alkali salts of monoaminoalkanecarboxylic acids and polyaminoalkanecarboxylic acids and the alkali metal salts thereof and the alkali metal salts of monoaminoalkanesulfonic acids, about 16% to about 33% by weight of polyhydroxy short chain alcohol distributed through and carried by said porous body, said polyhydroxy short chain alcohol containing from one to six carbon atoms and being neutral in character and stable at temperatures up to at least 175° F., and water distributed through and adsorbed on said porous body and bound by said polyhydroxy short chain alcohol.

References Cited

UNITED STATES PATENTS

| | | | |
|---|---|---|---|
| 2,718,454 | 9/1955 | Wylie | 252—190 |
| 2,818,323 | 12/1957 | Haensel | 252—190 |

MAYER WEINBLATT, Primary Examiner

I. GLUCK, Assistant Examiner

U.S. Cl. X.R.

23—2; 55—524; 210—502, 506; 252—411, 449